United States Patent Office 3,749,605
Patented July 31, 1973

3,749,605
BATTERY HAVING ZINC ELECTRODE
CONTAINING TiO₂
Randall W. Peters, Madison, Wis., assignor to
ESB Incorporated
No Drawing. Filed Nov. 3, 1971, Ser. No. 195,460
Int. Cl. H01m 43/02
U.S. Cl. 136—30                           1 Claim

ABSTRACT OF THE DISCLOSURE $TiO_2$ when included in zinc electrodes has been found to give improved shelf life in alkaline batteries designed to have high discharge rate capability. Negative electrodes containing the zinc and $TiO_2$ may be prepared in different manners. The invention is useful in primary alkaline systems such as silver-zinc and mercury-zinc.

Background of the invention

In the design of alkaline primary batteries having zinc electrodes it is generally known that high rate capability can be attained through various levels and combinations of the internal components, particularly the electrolyte concentration, zincate concentration, and separator system. Unfortumately the combinations of these components which result in high rate capability also aggravate the problem of electrolyte leakage and poor shelf life. Thus, there existed a dilemma: high rate capability could be obtained using several combinations of the above mentioned components, but only at a price of a reduction in the shelf life of the battery.

In the evolution of battery powered devices there are expanding needs for batteries having increased discharge rate capabilities, yet at the same time it is essential that the batteries have a long shelf life and be resistant to leakage. One area among many where this requirement is encountered is in hearing aids.

Titanium or a compound thereof has previously been used in a variety of ways in electrochemical cells including as an electrode active material or an additive thereto. In U.S. Pat. No. 1,139,213, for example, the active material for the negative electrodes in reversible alkaline batteries is produced by pouring a titanium compound solution into a zinc salt solution to obtain a precipitate containing a zinc-titanium compound. The precipitate is suitably collected, dried, and assembled into negative electrodes by being pressed into or onto a suitable grid or other conductor. The negative electrode thus prepared is then put into an alkaline solution and charged against a positive electrode until sufficiently reduced. The reduced zinc-titanium electrode is then discharged in an alkaline electrolyte preferably containing a soluble titanate. The charging and discharging is repeated until a permanently insoluble zinc-titanium compound is obtained in the electrode. This compound becomes oxidized to some unspecified state and degree during the charge and discharge of the battery containing the compound.

In U.S. Pat. No. 2,679,546 $TiO_2$ is used as a positive electrode active material in alkaline batteries.

In addition to the above mentioned uses as active materials, titanium or compounds thereof have been used for other purposes in electrochemical cells. For illustrations where the use is as a substrate onto or into which the active material or an electrode is applied, see the following patents: 3,3455,738; 3,499,795; 3,476,601; 3,161,545; 3,386,859; 3,388,004; 3,400,019; 3,411,954 and 3,444,004. For illustrations where the use is as a separator, see Pats. 3,425,871 and 3,489,610. Pat. 2,023,815 shows $TiO_2$ being used in the electrolyte of a zinc-copper primary cell. Titanium or some compound thereof is shown being used in electrodes in fuel cells in these patents: 3,262,816; 3,380,856; 3,386,859; 3,405,010; 3,432,362 and 3,537,906. Finally, Pats. 3,462,314 and 3,490,953 show compounds of Ti being used in the manufacture of ion exchange membranes for fuel cells.

Summary of the invention

This invention provides an alkaline battery capable of being discharged at relatively high rates and having superior shelf life.

The invention consists of including $TiO_2$ together with the zinc particles in the negative electrode of an alkaline battery.

The electrodes containing the zinc and $TiO_2$ may be prepared by various methods. In one, the proper portions of amalgamated zinc particles, a suitable gelling or suspending agent or a combination thereof, ZnO and $TiO_2$ are first thoroughly mixed while in a dry state; afterward this mixture is wetted with hydroxide solution to produce a paste which is then metered into the batteries as the negative electrodes. In another method, a dry mixture of amalgamated zinc particles, a gelling or suspending agent or some combination thereof, and $TiO_2$ is obtained after which a solvent that is compatible with the gelling or suspending agent is added to and mixed uniformly with the dry materials. Later the solvent is removed after which the then dry mixture is ground to obtain dry zinc particles which are then metered in the dry condition into batteries. Electrolyte is added to the batteries where it produces "in situ" a gell or suspension in the negative electrodes.

Description of the preferred embodiments

This invention concerns a battery comprising a positive electrode, a negative electrode comprising zinc particles and $TiO_2$, and alkaline electrolyte. The invention also concerns methods of producing the negative electrodes.

The batteries produced as a result of this invention have high discharge rate capabilities as well as good shelf life.

Before going into the data which illustrate the beneficial effects of this invention, it is appropriate to list briefly certain generalizations concerning zinc-alkaline batteries which are known based on the prior art. These generalizations include the following:

(1) A high concentration of alkaline electrolyte leads to long shelf life but low discharge rates. Conversely, a low concentration of alkaline electrolyte leads to short shelf life but high discharge rates.

(2) It is common to include ZnO in the electrolyte, up to the point where the electrolyte is saturated with ZnO. In general, including a maximum amount of ZnO in the electrolyte leads to long shelf life but low discharge rates, while decreasing the ZnO concentration from the maximum has the effects of decreasing shelf life but increasing discharge rate.

(3) A "maximum" separator system is one in which the amount and type of separator material(s) are selected to result in maximum shelf life. A "minimum" separator system is one in which the amount and type of separator material(s) are selected to result in maximum rate capability. The rate capability of a battery having a maximum separator system is less than one having a minimum separator system, all other factors remaining equal.

The data to be presented below will present results from control cells which were made without the present invention but in which the electrolyte concentrations, ZnO concentrations, and the separator systems were varied. The results from these control cells support the generalizations given above. The data will go on to present results from cells made on the basis of the present invention. A comparison of the results from the two sets of cells will illustrate how the inclusion of $TiO_2$ into the negative electrode according to this invention permits adjustments to be made in the electrolyte concentration, ZnO concentration, and separator system which lead to high rate capability but still result in a cell which has superior shelf life. The data will also illustrate that these desirable results can be obtained from cells in which the negative electrodes were produced by different manners.

uniformly with the dry materials. The solvent was later removed after which the then dry mixture was ground to obtain dry zinc particles. These particles were metered into the batteries and the electrolyte was subsequently added.

A number of comparisons of the data in Table 1 illustrate the beneficial effects of $TiO_2$.

Comparing the Control 3 cells with Case 1 cells (both

TABLE 1

| Description | KOH conc. | ZnO conc. | Separator system | $TiO_2$ conc. | Amperage (in amps) | Shelf-life in months |
|---|---|---|---|---|---|---|
| Production Control | High | Maximum | Maximum | 0 | 0.3–0.5 | 24.0 |
| Control 1 | do | do | do | 0 | 0.4–0.5 | 20.5 |
| Control 2 | Low | do | do | 0 | 0.8–0.9 | 4.0 |
| Control 3 (Case 1) | High | Minimum | do | 0 | 1.1–1.2 | 3.0 |
| Control 4 | Low | do | do | 0 | 1.2–1.3 | 2.0 |
| Control 5 | High | Maximum | Minimum | 0 | 0.6 | 20.5 |
| Control 6 (Case 2) | Low | do | do | 0 | 0.9–1.0 | 3.0 |
| Control 7 (Case 3) | High | Minimum | do | | 1.2–1.3 | 5.0 |
| Control 8 | Low | do | do | 0 | 1.5–1.7 | 1.5 |
| Case 1: | | | | | | |
| Method 1 Variation | High | do | Maximum | 0.80 | 1.0 | 26.0 |
| Method 2 Variation | do | do | do | 0.82 | 0.8 | >26.0 |
| Case 2: Method 1 Variation | Low | Maximum | Minimum | 8.34 | 0.8–0.9 | 10.0 |
| Case 3: | | | | | | |
| Method 1 Variation | High | Minimum | do | 0.80 | 1.2–1.3 | 27.0 |
| Method 2 Variation | do | do | do | 0.82 | 1.1–1.2 | 24.0 |

Notes:
KOH concentration: "High" indicates 45–46% KOH electrolyte. "Low" indicates 34–35% KOH electrolyte.
ZnO concentration: "Maximum" indicates the percent ZnO in the electrolyte is at or near the saturation point for the KOH concentration indicated. "Minimum" indicates the ZnO concentration is present only in an amount sufficient to prevent the negative electrode from gassing, 0.5–1.0%.
Separator system: "Maximum" indicates that the amount and type of material(s) used were known to be optimal for long shelf life. "Minimum" indicates that the amount and type of material(s) used were known to be optimal for high rate capability.
$TiO_2$ concentration: Concentrations are given as percentage of total amalgamated zinc+$TiO_2$ weight.
Amperage: Flash amperage readings taken before discharge are an indication of rate capability. The higher the amperage, the better the cell will perform at increasingly higher rates of discharge.
Shelf life: The values indicated are room temperature projections based on averages of multiple environmental storage conditions.

TABLE 1

Table 1 presents results from nine sets of control cells ("Production Control" and "Control 1–Control 8") which are commercially available size 41G silver-zinc cells. The nine sets of control cells contained no $TiO_2$. The results from the control cells show the effects of variations in electrolyte concentration, ZnO concentration, and the separator system; these results support the generalization stated above.

Also presented in Table 1 are the results of three additional sets of size 41G silver-zinc cells (Cases 1–3) all of which contained amounts of $TiO_2$ in the negative electrodes. In addition to the variables of electrolyte concentration, ZnO concentration, the separator system, and the $TiO_2$ concentration, the cells represented by Cases 1, 2 and 3 also reflect another variable, the method used to make the negative electrodes which contained the $TiO_2$.

One of the methods used to produce negative electrodes, identified by the heading "Method 1 Variation," resulted in a paste which was later metered into the batteries as the negative electrodes. With this method the proper portions of amalgamated zinc particles, a suitable gelling or suspending agent, ZnO and $TiO_2$ were first weighed out, after which they were blended or mixed together until a uniform mixture of the above named dry components was effected. At this point alkaline electrolyte was added to the dry components to produce a paste, either by slowly mixing in KOH pellets or flakes simultaneously with distilled water or by adding pre-made KOH solution slowly to the dry components. The ingredients were mixed until the electrolyte was uniformly distributed throughout the paste. After allowing the paste mixture to cool, the paste was metered ino the batteries to produce the negative electrodes.

The other method used to produce negative electrodes resulted in materials which were metered into the batteries in the dry condition, where electrolyte was then added to produce a gel or suspension "in situ" in the negative electrodes. With this method a dry mixture of amlgamated zinc particles, a gelling or suspending agent, and the $TiO_2$ was obtained. Next, a solvent that was compatible with the gelling or suspending agent was added to and mixed method variations), it is evident that the inclusion of $TiO_2$ in the negative electrodes maintained high capability (amperage) and produced substantial increases in shelf-life, and that these beneficial effects were not limited to a single method of preparing the negative electrodes.

Comparing the Control 6 cells with the Case 2 cells, it appears that the inclusion of $TiO_2$ in the negative electrodes resulted in maintaining high rate capability and produced a similar marked increase in shelf life but with a different combination of electrolyte concentration, ZnO concentration, separator system, and $TiO_2$ concentration.

Comparing the Control 7 cells with Case 3 cells (both method variations), it again appears that the addition of $TiO_2$ to the negative electrodes maintained high discharge capability and substantially increased the shelf life, and that these results are not associated with a unique method of producing the negative electrodes.

The data in Table 1 therefore indicates that the addition of $TiO_2$ to the negative electrodes makes possible cells which have both high discharge characteristics and long shelf life.

TABLE 2

Table 2 presents the results from size 41G silver-zinc batteries which were exposed to a purposely harsh environment. The negative electrodes were made by "Method 1 Variation" (explained above).

TABLE 2

| Description | Percent KOH | Percent $TiO_2$ | Amperage (in amps) | Shelf-life, percent rejects after $x$ weeks storage at 130° F. −50%, $x=$ | | |
|---|---|---|---|---|---|---|
| | | | | 2 | 4 | 6 |
| Control | 45 | 0.0 | 1.1–1.4 | 5.9 | 53.0 | 100 |
| Variation 1 | 45 | 0.75 | 1.2–1.4 | 5.5 | 27.8 | 70.0 |
| Variation 2 | 45 | 2.94 | 1.1–1.3 | 0.0 | 16.7 | 33.3 |
| Variation 3 | 45 | 5.68 | 1.1–1.2 | 5.5 | 38.9 | 66.7 |
| Control | 35 | 0 | 0.9–1.0 | 0.0 | 23.6 | 100 |
| Variation 4 | 35 | 8.34 | 0.8–0.9 | 0.0 | 0.0 | 21.1 |

The data in Table 2 indicate that the inclusion of $TiO_2$ in the negative electrodes has the effects of maintaining high rate capability and improving shelf-life at elevated temperatures, and that this is true even over a very wide range of $TiO_2$ concentration.

TABLE 3

Table 3 is analogous to Table 2. However, the cells represented by Table 3 were size 13R mercury-zinc batteries, and their negative electrodes were made by "Method 2 Variation" (explained above).

TABLE 3

| Description | Percent KOH | Percent $TiO_2$ | Amperage (in amps) | Shelf-life, percent rejects after $x$ weeks storage at 145° F. −50%, $x=$ | | |
|---|---|---|---|---|---|---|
| | | | | 1 | 2 | 4 |
| Control | 30 | 0 | 0.4 | 4.5 | 36.4 | 95.5 |
| Variation | 30 | 1 | 0.4 | 0.0 | 8.0 | 32.0 |

Table 3 establishes that the addition of the $TiO_2$ additive to the zinc negative electrodes leads to high rate capability and long shelf life in primary alkaline mercury-zinc batteries. Tables 1 and 2 support similar conclusions with respect to another primary alkaline system, the silver-zinc system.

Other considerations

It is common to include one or more gelling agents, one or more suspending agents, or combinations of one or more gelling agents with one or more suspending agents with the zinc particles in the negative electrodes. Commonly used gelling agents include various species of carboxy methyl cellulose, guar gums, and many others. Commonly used suspending agents include polyacrylic acids, polymethacrylic acids, and many others; see U.S. Pat. No. 3,207,633 for other suspending agents. This invention is not limited to the use of gelling or suspending agents per se or to the use of particular gelling or suspending agents to combinations thereof.

Also, while KOH is the most commonly used alkaline electrolyte, it is known that NaOH may be used together with or as a substitute for KOH in alkaline cells. While this invention may be limited to alkaline electrolyte systems, it is not limited to specific compositions or concentrations of the electrolyte.

I claim:
1. A battery comprising:
   (a) a positive electrode;
   (b) a negative electrode comprising a mixture of amalgamated zinc particles and $TiO_2$; and
   (c) alkaline electrolyte.

References Cited
UNITED STATES PATENTS

| 3,617,384 | 11/1971 | Kamai et al. | 136—30 |
| 1,139,213 | 5/1915 | Morrison | 136—30 |
| 3,671,319 | 6/1972 | Arrange | 136—30 |

L. DEWAYNE RUTLEDGE, Primary Examiner

M. J. ANDREWS, Assistant Examiner

U.S. Cl. X.R.
136—106, 125